(12) United States Patent
Hall et al.

(10) Patent No.: US 7,748,737 B2
(45) Date of Patent: Jul. 6, 2010

(54) VARIABLE OUTPUT INFLATOR

(75) Inventors: Ian Brewster Hall, Ann Arbor, MI (US); Paul Simmons, Chesterfield, MI (US); Yan Fu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 614 days.

(21) Appl. No.: 11/654,259

(22) Filed: Jan. 16, 2007

(65) Prior Publication Data

US 2008/0172157 A1   Jul. 17, 2008

(51) Int. Cl.
*B60R 21/26* (2006.01)
*B60R 21/013* (2006.01)

(52) U.S. Cl. .................. 280/736; 280/737; 251/129.15

(58) Field of Classification Search .............. 280/736, 280/742, 735, 737; 251/129.15
See application file for complete search history.

(56) References Cited

U.S. PATENT DOCUMENTS

| | | | |
|---|---|---|---|
| 5,683,105 A | 11/1997 | Jackson | |
| 5,802,480 A * | 9/1998 | Shiraishi | 701/45 |
| 5,820,162 A * | 10/1998 | Fink | 280/742 |
| 5,857,698 A | 1/1999 | Fuerst et al. | |
| 5,882,036 A * | 3/1999 | Moore et al. | 280/736 |
| 5,927,753 A * | 7/1999 | Faigle et al. | 280/735 |
| 6,068,288 A * | 5/2000 | Karolek et al. | 280/735 |
| 6,076,852 A | 6/2000 | Faigle | |
| 6,123,358 A * | 9/2000 | Ryan et al. | 280/739 |
| 6,142,516 A * | 11/2000 | O'Loughlin et al. | 280/738 |
| 6,231,077 B1 | 5/2001 | Karolek et al. | |
| 6,247,726 B1 * | 6/2001 | Ryan | 280/739 |
| 6,253,683 B1 * | 7/2001 | Fukabori | 102/530 |
| 6,431,596 B1 * | 8/2002 | Ryan et al. | 280/739 |
| 6,564,717 B2 | 5/2003 | Haerle et al. | |
| 6,966,578 B2 | 11/2005 | Smith | |

* cited by examiner

*Primary Examiner*—Paul N Dickson
*Assistant Examiner*—Drew Brown
(74) *Attorney, Agent, or Firm*—Franklin MacKenzie; Ford Global Technologies, LLC

(57) ABSTRACT

A method of inflating an airbag with a fluid includes sending a signal to open a first valve and opening the first valve. The method also includes directing a control pressure through the first valve and toward a second valve. The method further includes throttling the second valve in response to the control pressure. The throttling of the second valve produces a variable inflation mass flow rate of the fluid at a second valve outlet. Opening the first valve and closing the first valve are performed as a step function to achieve a desired predetermined variable inflation mass flow rate of the airbag.

18 Claims, 3 Drawing Sheets

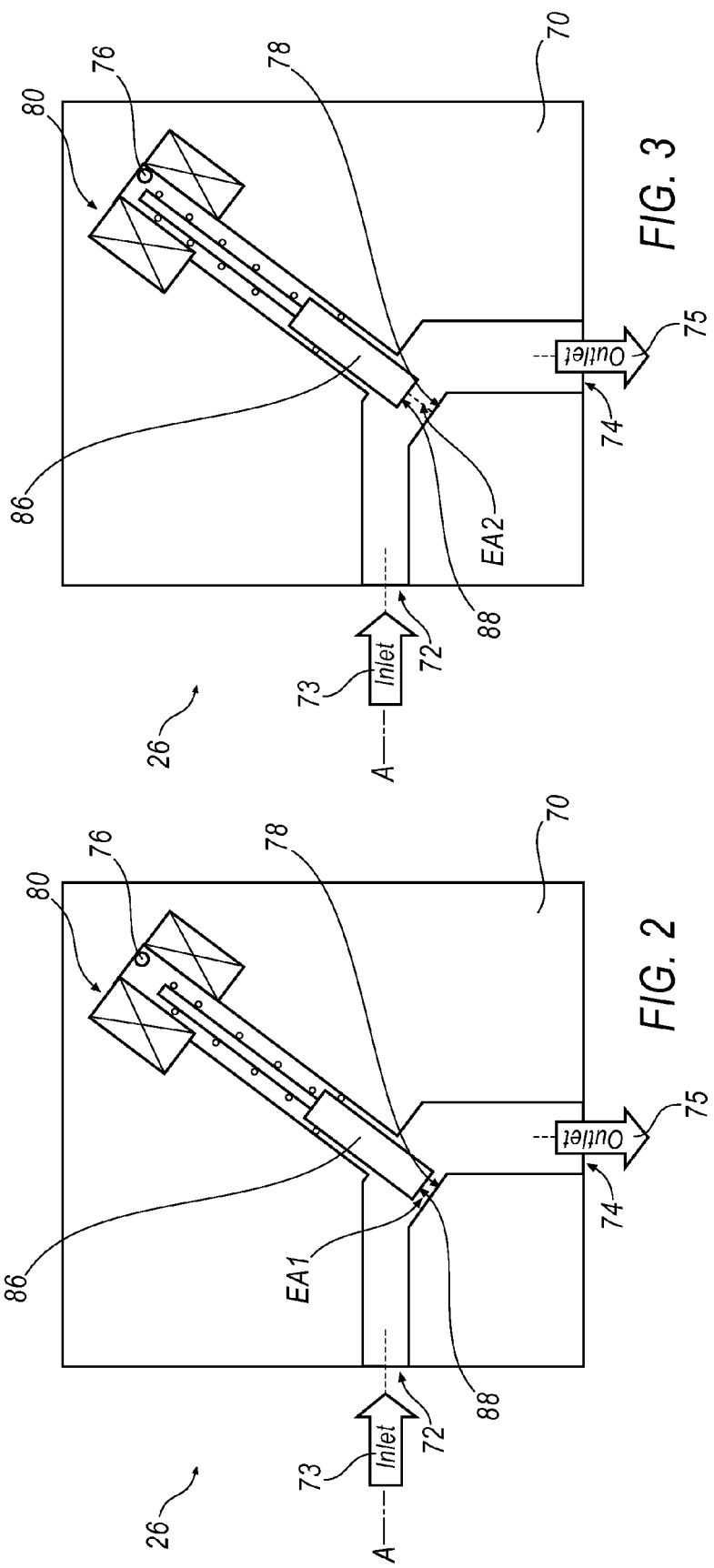

VARIABLE OUTPUT INFLATOR

TECHNICAL FIELD

The disclosure generally relates to airbag inflators and specifically to control systems for airbag inflators that may be tailored for anticipated events.

BACKGROUND

An airbag is typically inflated with a pressurized source of gas. While airbags originally included single stage inflators, or inflators that would supply a constant effective flow area for a variable pressure, some recent airbag inflators have been adapted to supply more than one flow rate to inflate the airbag. These 'dual stage' airbag inflators typically are initiated by a control logic that determines what 'type' of crash event is being experienced and provides a selected flow rate to inflate the airbag. However, these dual stage inflators typically provide only adaptive vents, adaptive columns, dual-stage pyro inflators, or other systems that provide limited utility. Hybrid pyro inflators may also be used, but are sensitive to pressure waves within the system that affect the burn and subsequent development of gas flow and pressure.

With continual development in understanding crash dynamics and what parameters would be useful in altering inflation mass flow rates and to what degree, dual stage airbag inflators may no longer provide a desired flow rate for a specific initiating event that can be somewhat accurately detected and compensated for in an airbag inflation sequence. What is needed, therefore, is an apparatus and method for inflating an airbag that may be tailored to a specific defined initiation event. A favorable apparatus would be readily altered for use in different vehicle types, such as small cars, medium duty trucks, and light duty trucks.

SUMMARY

An illustrative embodiment includes a method of inflating an airbag with a fluid. The method includes sending a signal to open a first valve and opening the first valve. The method also includes directing a control pressure through the first valve and toward a second valve. The method further includes throttling the second valve in response to the control pressure. The throttling of the second valve produces a variable inflation mass flow rate of the fluid at a second valve outlet. Opening the first valve and closing the first valve are performed as a step function to achieve a desired predetermined variable inflation mass flow rate of the airbag

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

FIG. 2 is a schematic view of a control valve according to an embodiment, illustrated in a first configuration.

FIG. 3 is a schematic view of a control valve according to an embodiment, illustrated in a second configuration.

DETAILED DESCRIPTION

Figure 1:
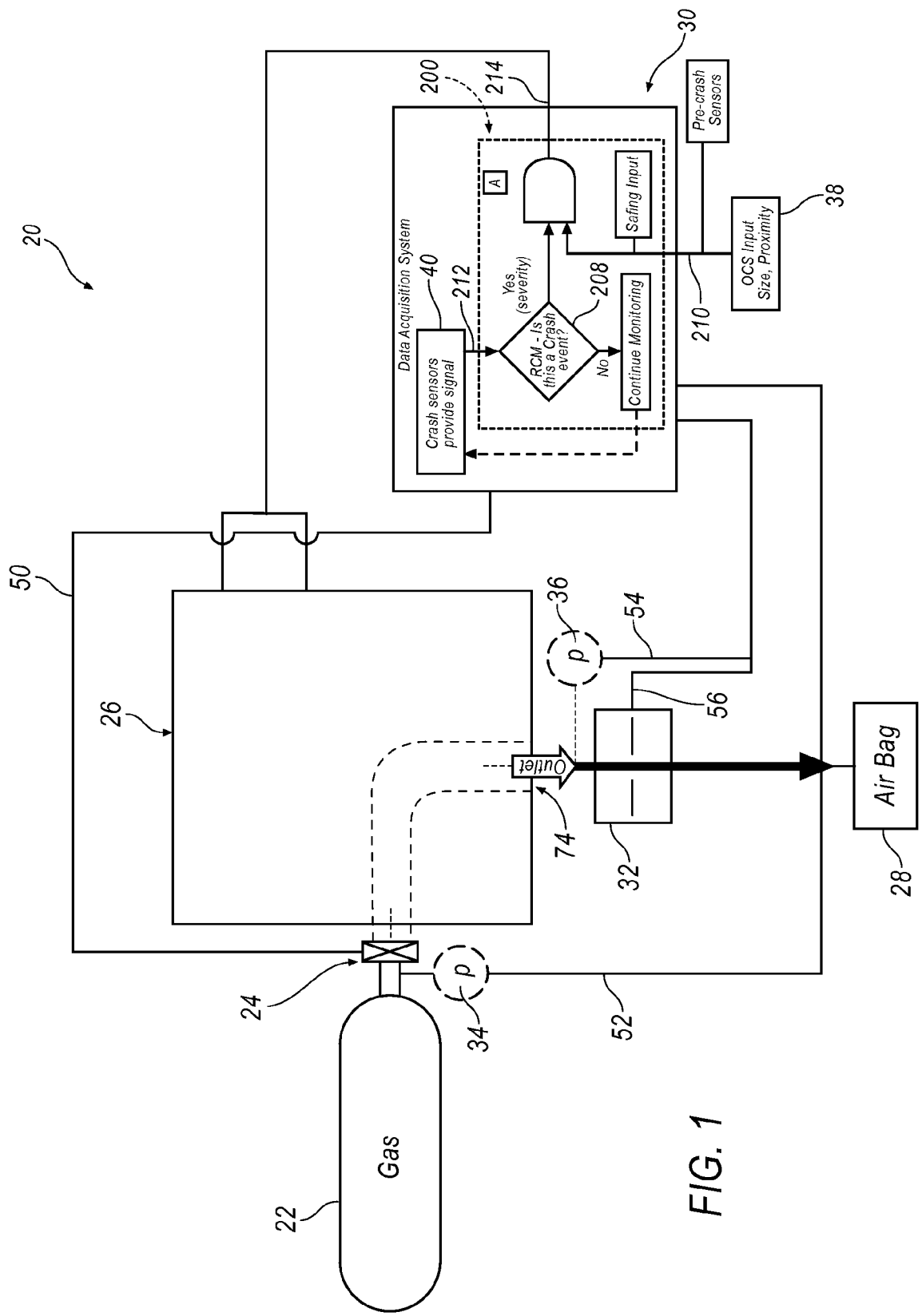
FIG. 1 is a schematic view of an airbag inflator system according to an embodiment.

FIG. 1 illustrates an embodiment of an airbag inflator system 20. The system 20 includes a gas supply container 22, a main valve 24, a control valve 26, an airbag 28, a control module 30, a flow meter 32, a primary gas pressure sensor 34, a secondary gas pressure sensor 36, occupant sensors 38, and crash sensors 40. The main valve 24 is connected to the module 30 via a communication link 50 and is opened by the module 30 to connect the gas supply container 22 with the control valve 26. The primary gas pressure sensor 34 senses the pressure inside the gas supply container 22 and is connected to the module 30 via a communication link 52. The secondary gas pressure sensor 36 senses the pressure inside the control valve 26 and is connected to the module 30 via a communication link 54. The flow meter 32 senses the mass flow of gas between the control valve 26 and the airbag 28 and is connected to the module 30 via a communication link 56.

In the embodiment illustrated, the gas supply container 22 is a source of stored gas at about 12,000 psi (kpa), although other suitable gas supplies may be used. The control valve 26 is opened with pyrotechnics, although other opening mechanisms may be used. The airbag 28 is a conventional airbag of standard or non-standard design.

As best seen in FIG. 2, the control valve 26 includes a valve body 70, a main inlet 72, a main outlet 74, and a vent 76. In the embodiment illustrated, the body 70 houses a solenoid valve 80, a ring valve 82, and an actuation piston 84. Specifically, the body 70 defines an inlet passageway 90 that opens into a shared passageway 92 that opens to both a ring valve inlet 94 and a solenoid valve inlet 96. The solenoid valve inlet 96 opens to a solenoid valve chamber 100 which is in fluid communication with a piston cylinder 102 at a first cylinder end 104 and a solenoid valve vent 106. The ring valve inlet 94 includes a ring valve seat mating surface 110 and a ring valve plate chamber 112 that opens to both a control valve outlet 114 and the piston cylinder 102 at a second cylinder end 116.

The solenoid valve 80 is positioned within the solenoid valve chamber 100. The solenoid valve is switchable between a first configuration, or an open configuration, where the solenoid valve inlet 96 is in fluid communication with the first cylinder end 104 of the piston cylinder 102, and a second, or closed, configuration, where the solenoid valve inlet 96 is in fluid communication with the solenoid valve vent 106. The control valve 26 includes a ring valve seat 120, a ring valve plate 122, a ring valve plunger 124, and the piston 84 attached to the ring valve plunger 124. The ring valve seat 120 is circumscribed by the ring valve seat mating surface 110. The ring valve plate 122, the ring valve plunger 124, and the piston 84 are attached to move axially along an axis A-A as a single device. The ring valve seat 120 is defined in part by a seat inlet surface 130 and a seat mating surface 132. The ring valve plate 122 is defined in part by a plate outlet surface 136 and a plate mating surface 138. The ring valve seat 120 includes ring valve apertures 140 formed therein where each ring valve aperture 140 opens to both the seat inlet surface 130 and the seat mating surface 132. The ring valve plate 122 includes ring valve plate apertures 142 formed therein where each ring valve plate aperture 142 opens to both the plate outlet surface 136 and the plate mating surface 138. The ring valve seat 120 and the ring valve plate 122 matingly engage with the seat mating surface 132 in contact with the plate mating surface 138 so as to permit a flow of fluid therethrough. That is, both the ring valve seat 120 and the ring valve plate 122 align such that at least a portion of the ring valve apertures 140 align with at least a portion of the ring valve plate apertures 142, in the embodiment illustrated.

The solenoid valve 80 includes a solenoid valve plunger 150, a coil 152, and a spring 154. As best seen in FIG. 2, when the solenoid valve 80 is in the first (open) configuration, the plunger 150 seals the solenoid valve vent 106 from the solenoid valve chamber 100. As best seen in FIG. 3, when the solenoid valve 80 is in the second (closed) configuration, the plunger 150 seals the solenoid valve inlet 96 from the solenoid valve chamber 100.

As best seen in FIG. 2, when the plate mating surface 138 of the ring valve plate 122 is mated with the seat mating surface 132 of the ring valve seat 120, the partial alignment of the apertures 140, 142 create an effective area EA1 at the mating surfaces 132, 138 for flow of a fluid (not numbered) therethrough. As best seen in FIG. 3, when the plate mating surface 138 of the ring valve plate 122 is spaced from the seat mating surface 132 of the ring valve seat 120, the fluid may flow through the apertures 140, 142 while not restricted by the effective area EA1, to create an effective area EA2 for flow of a fluid therethrough. The effective area EA2 may generally be the lesser combined area of apertures 140 and the combined area of apertures 142.

When the solenoid valve 80 is in the first configuration, (FIG. 2) any fluid that flows into the solenoid valve 80 will be directed toward the first cylinder end 104 of the piston cylinder 102. When enough fluid enters the first cylinder end 104 of the piston cylinder 102 at a sufficient pressure, the piston 84 is urged toward the ring valve seat 120, thereby urging the ring valve plate 122 to matingly engage the ring valve seat 120 such that surface 132 contacts the surface 138. Therefore, when the solenoid valve 80 is in the first configuration, the control valve 26 will limit the flow of the fluid by permitting flow through effective area EA1.

When the solenoid valve 80 is in the second configuration, no fluid will flow into the solenoid valve 80 and the first end 104 of the piston chamber 102 will be vented through the solenoid valve vent 106 to atmosphere. The flow of fluid through the apertures 140 will urge the ring valve plate 122 to move away from the ring valve seat 120. Therefore, when the solenoid valve 80 is in the second configuration, the control valve 26 will limit the flow of the fluid by permitting flow through effective area EA2.

Referring back to FIG. 1, the flow meter 32 detects the mass flow of the fluid between the control valve outlet 114 and the airbag 28 and sends a signal to the control module 30 via the link 56. The primary gas pressure sensor 34 detects the gas pressure within the gas supply container 22 and sends a signal to the control module 30 via the link 52. The secondary gas pressure sensor 36 detects the gas pressure within the first end 104 of the cylinder 102 and sends a signal to the control module 30 via the link 54. In the embodiment illustrated, the occupant sensors 38 include occupant position, seat belt status (buckled, unbuckled, etc. . . . ) weight, and height, and the crash sensors 40 include vehicle weight, vehicle speed, estimated weight and speed of potential collision vehicle, etc. Collectively, these inputs to the occupant sensors 38 and the crash sensors 40 are referred to as inflation parameters.

The control module 30 includes a microprocessor 200. A portion of the control logic of the microprocessor 200 is illustrated schematically at 208. The control module 30 is connected to the occupant sensors 38 via a communication link 210. The control module 30 is connected to the crash sensors 40 via a communication link 212. The control module 30 is connected to the solenoid valve 80 via a communication link 214.

Figure 4:
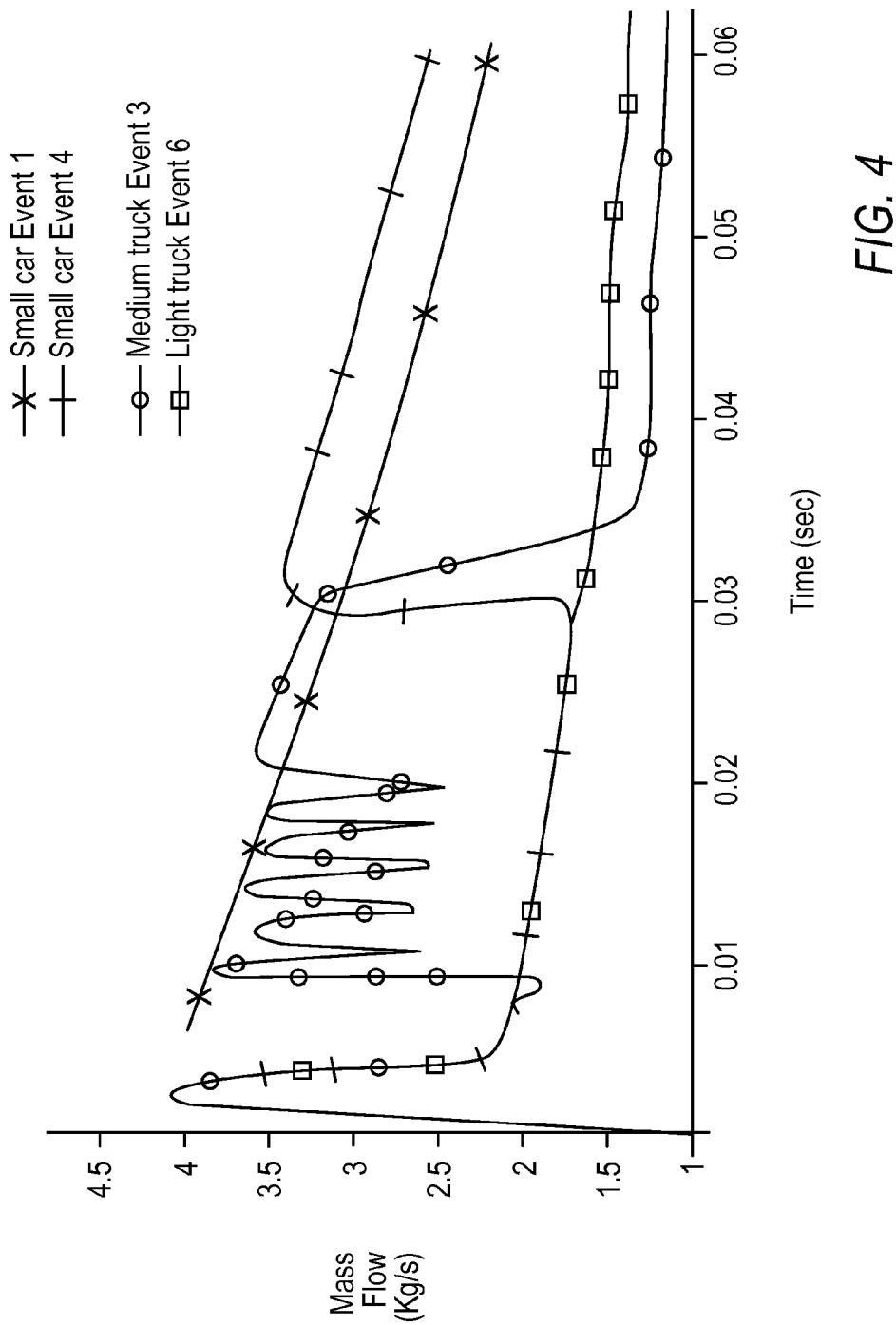
FIG. 4 is a graphical representation of various mass flow rates for selected exemplary operational modes of the system of FIG. 1.

FIG. 4 illustrates exemplary embodiments desired variable inflation mass flow rates for anticipated events. That is, differing crash events may be counter acted by deploying an airbag differently, depending upon various detected inflation parameters.

In a first event, labeled 'small car, event 1', the airbag 28 is deployed as the main valve 24 is opened and the control valve 26 is opened in the second state to permit a flow through the second effective area EA2. Accordingly, the mass flow rate illustrated for the first event is a high flow rate that diminishes with the reduction in pressure in the gas supply container 22.

In a second event labeled 'small car, event 4', the airbag 28 is deployed as the main valve 24 is opened and the control valve 26 is opened in the second state for approximately 3 milliseconds (ms) to permit a flow through the second effective area EA2. The control valve 26 is then switched to the first state (FIG. 2) for approximately 27 milliseconds (ms) to permit a flow through the first effective area EA1. Accordingly, the mass flow rate illustrated for the second event is a high flow rate for 3 ms, switching to a low flow rate for about 27 ms, and then returning back to a higher flow rate that diminishes with the reduction in pressure in the gas supply container 22.

In a third event labeled 'light truck, event 6', the airbag 28 is deployed as the main valve 24 is opened and the control valve 26 is opened in the second state for approximately 3 milliseconds (ms) to permit a flow through the second effective area EA2. The control valve 26 is then switched to the first state (FIG. 2) to permit a flow through the first effective area EA1 which yields a low flow rate that diminishes with the reduction in pressure in the gas supply container 22.

In a fourth event labeled 'medium truck, event 3', the airbag 28 is deployed as the main valve 24 is opened and the control valve 26 is opened in the second state for approximately 3 milliseconds (ms) to permit a flow through the second effective area EA2. The control valve 26 is then switched to the first state (FIG. 2) for approximately 7 milliseconds (ms) to permit a flow through the first effective area EA1 which yields a low flow rate. The control valve 26 is then switched to the second state from the first state and then oscillated between the first state and the second state 5 times with the oscillations occurring about every 2 ms. The control valve is maintained in the second state for about 10 ms and then switched back to the first state. Accordingly, the mass flow rate illustrated for the fourth event is a high flow rate for 3 ms, switching to a low flow rate for about 7 ms, and then oscillating between a higher flow rate and a lower flow rate, then maintaining a higher flow rate that diminishes with the reduction in pressure in the gas supply container 22, then finishing with a low flow rate that diminishes with the reduction in pressure in the gas supply container 22.

While FIG. 4 presents exemplary embodiments of desired airbag inflation curves, it is understood that an infinite number of examples may exist as newly developed crash simulations and detectors for potential crash and occupant parameters are available.

In operation of the system 20, the control module 30 may interpret signals from the crash sensors 40 as a crash event. This interpretation may involve only one sensor (such as an accelerometer) or multiple crash sensors 40. When a determination is made that a crash event is occurring, or is imminent, the control module 30 will evaluate information from the occupant sensors to determine input parameters such as occupant position, seat belt status (buckled, unbuckled, etc. . . . ) weight, height, to name a few, and determine what inflation curve to employ. Importantly, an inflation curve, such as the exemplary inflation curves of FIG. 4, may be determined by a look-up table, may be standard curves selected for various ranges of parameters, or may be determined by an algorithm exclusively for each individual event.

Once a desired inflation curve is determined, the control module 30 will then deploy the system 20 so as to inflate the airbag 28 to simulate, or closely emulate the desired curve. Importantly, data from actual crash tests may be incorporated into the deployment logic to encourage the selection of an appropriate inflation curve. The control module 30 will open the main valve 24 and switch the solenoid valve 80, if required, the effect the desired inflation curve (as best seen in FIG. 4).

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method of inflating an airbag with a fluid comprising:
   sending a signal to open a first valve;
   opening the first valve;
   directing a control pressure through the first valve and toward a second valve; and
   throttling the second valve in response to the control pressure, wherein the throttling of the second valve produces a variable inflation mass flow rate of the fluid at a second valve outlet, wherein opening the first valve and closing the first valve are performed as a step function to achieve a desired predetermined variable inflation mass flow rate of the airbag, and the inlet to the first valve is in constant fluid communication with an inlet of the second valve.

2. The method of claim 1, wherein an inlet to the second valve is in constant fluid communication with the outlet of the second valve such that the second valve does not prevent the fluid flow through the second valve.

3. The method of claim 1, wherein throttling the second valve includes switching the second valve from permitting the fluid to flow through a first predetermined effective flow area to permitting the fluid to flow through a second predetermined effective flow area and back to permitting the fluid to flow through a first predetermined effective flow area, wherein neither the first predetermined effective flow area and the second predetermined effective flow area are equal to about zero.

4. The method of claim 1, further comprising detecting an inflation parameter and calculating a desired variable flow rate using the inflation parameter.

5. The method of claim 4, wherein the inflation parameter is one of a belt status, an occupant position, a pre-crash state, a post-crash state, and a vehicle dynamic parameter.

6. The method of claim 1, further comprising selecting an algorithm based upon a vehicle type, wherein the algorithm is used in the calculating a desired variable flow rate using the inflation parameter.

7. An apparatus for inflating an airbag comprising:
   a control valve having a control valve inlet and a control valve outlet, wherein the control valve selectively provides a first predetermined flow area, wherein a fluid is selectively permitted to flow through the first predetermined flow area to produce a first predetermined mass flow rate at a first predetermined fluid pressure, wherein the control valve selectively provides a second predetermined flow area, and wherein the fluid is selectively permitted to flow through the second predetermined flow area to produce a second predetermined mass flow rate at a second predetermined fluid pressure;
   a sensor for detecting an inflation parameter; and
   a control module, wherein the control module will selectively switch the control valve between permitting the fluid to flow through the first predetermined effective flow area and permitting the fluid to flow through the second predetermined effective flow area to achieve a desired first variable mass flow rate at the outlet of the control valve, and wherein the desired first variable mass flow rate is selectively determined by the control module using an occupant parameter as an input to an algorithm, and the control valve does not provide a seal between the control valve inlet and the control valve outlet.

8. The apparatus of claim 7, wherein the control module may selectively provide a second variable mass flow rate at the outlet of the control valve.

9. The apparatus of claim 7, wherein the control module will selectively switch the control valve from permitting the fluid to flow through the first predetermined effective flow area to permitting the fluid to flow through the second predetermined effective flow area and back to permitting the fluid to flow through the first predetermined effective flow area in less than about 5 milliseconds.

10. The apparatus of claim 7, wherein the control module further comprises a microprocessor to control the switching of the control valve based upon at least one inflation parameter.

11. The apparatus of claim 7, wherein the sensor detects one of a belt status, an occupant position, a pre-crash state, a post-crash state, and a vehicle dynamic parameter.

12. The apparatus of claim 7, further comprising a plurality of sensors for detecting a plurality of inflation parameters.

13. The apparatus of claim 7, wherein the control valve includes a solenoid valve and a ring valve.

14. A method of inflating an airbag with a fluid comprising:
   sending a signal to open a first valve;
   opening the first valve;
   directing a control pressure through the first valve and toward a second valve;
   detecting an inflation parameter, wherein the inflation parameter is one of a belt status, an occupant position, a pre-crash state, a post-crash state, and a vehicle dynamic parameter; and
   switching the second valve from permitting the fluid to flow through a first predetermined effective flow area to permitting the fluid to flow through a second predetermined effective flow area and back to permitting the fluid to flow through a first predetermined effective flow area, wherein neither the first predetermined effective flow area and the second predetermined effective flow area are equal to about zero.

15. The method of claim 14, wherein the first valve is a solenoid valve and the second valve is a ring valve.

16. The method of claim 14, further comprising determining a desired first variable mass flow rate based upon at least the inflation parameter.

17. The method of claim 15, further comprising selecting an algorithm based upon a vehicle type, wherein the algorithm is used in the determining a desired first variable mass flow rate.

18. The method of claim 14, wherein the detecting an inflation parameter includes sending a sensor input to a microprocessor.

* * * * *